Figure 1:
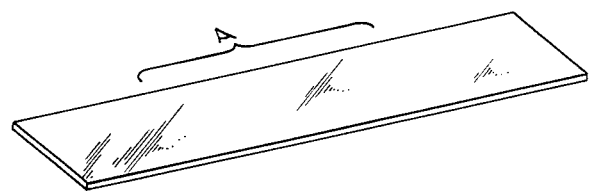

Feb. 27, 1962 P. L. PASSLEY ET AL 3,022,541
PRODUCING INDICIA IN FILM BY MODIFICATION OF FILM OPACITY
Filed Feb. 5, 1960

INVENTORS
P.L. PASSLEY
J.F. EBERLE
BY
Hudson and Young
ATTORNEYS 3,022,541
PRODUCING INDICIA IN FILM BY MODIFICATION OF FILM OPACITY
Paul L. Passley and Jack F. Eberle, Bartlesville, Okla., assignors to Phillips Petroleum Company, a corporation of Delaware
Filed Feb. 5, 1960, Ser. No. 6,964
2 Claims. (Cl. 18—48)

This invention relates to producing indicia in film by modification of the opacity of the film.

Polyethylene film has received wide acceptance in the packaging industry because it is strong and easily handled. One difficulty resides in the fact that it is difficult to print upon or otherwise decorate the material. Some inks have been developed which can be used and particular surface treatments have been developed.

We have discovered a new method of printing upon or otherwise decorating a film having polyethylene as the major component. The process also provides a good method of producing transparent areas in such film coverings, such a method being used to provide the familiar "see through" container.

The object of our invention is to provide a new method for producing indicia in thermoplastic film by modifying the opacity thereof.

The drawing shows film treated according to the process of our invention.

Broadly, this object is obtained by using a film containing a major amount of a polyolefin polymer, such as polyethylene, and a second thermoplastic material which is incompatible with the polyolefin polymer. A mixture of these polymers forms a composition which is analogous to the solid solution obtained when certain metals are mixed. A film of a mixture of these two polymeric materials appears transparent although there is a small amount of haze therein. Printed material can be easily read through a film having a thickness of 10 to 20 mils when the film is in contact with the printing.

To produce the indicia, two operations are required. The first of these comprises stretching the film of the mixture of polymers to increase its opacity. This stretching varies with different mixtures of polymers and depends upon whether the film is stretched in the machine direction or in a direction transverse to the machine direction. Obviously, it will not be stretched to the breaking point. The stretching generally is from 30 to 600 percent of the original length. Another method of defining the amount of stretching is in the amount of necking which occurs. Generally, the film will neck down to approximately one-half of the original width. With a particular mixture of polymers, it will be necessary to carry out a few experiments to determine the amount of stretching necessary for this first operation. In any event, this stretching, as defined, will increase the opacity of the film in the stretched portion. In other words, it will be much more difficult to read through the film, although minor portions of the incident light will be passed.

The second step of the method of our invention is carried out by pressing the stretched film with a stylus or other object which will decrease the opacity of the film in the pressed area, thereby producing desired indicia in the film. The familiar ball point pen can be used for this pressing operation. The pressure should be within the range of 500 to 20,000 pounds per square inch. The film, after stretching, should be supported upon a substantially non-yielding surface while it is being marked upon. This is done to prevent rupture of the film. This pressing will reduce the opacity of the processed film below that of the original film. Thus it is possible to write upon the film without the use of ink. Obviously, the whole area of the stretched film could be pressed so that it would be transparent.

The major component of the film of our invention is a polyolefin such as polyethylene, polypropylene, copolymers of ethylene and propylene, and copolymers of ethylene and butene-1. Polyethylene is the material of greatest commercial importance at this time and where this polymer is referred to in this disclosure, it should be understood that the other polymers above recited can also be used. Any type of polyethylene can be used including the old and well known high pressure types such as disclosed in U.S. Patent No. 2,153,553. Newer types of polyethylene include those produced by the organo-metal systems such as a mixture of titanium tetrachloride and triisobutyl aluminum. Another suitable type of polymer is that produced according to the method of Hogan et al. in Patent No. 2,825,721. The high density, highly crystalline types are preferred. When measured at 20° C. the density of these materials is in the range of 0.94 to 0.97.

The second component of the mixture of polymers is a plastic material which is incompatible with the polyethylene or other polyolefin as set forth above. One example of such material is polyisobutylene, commercially available under the trademark "Vistanex." This polymer of isobutylene is produced by polymerizing the monomer at temperatures ranging from −40° C. to −100° C. in the presence of a Friedel-Crafts type catalyst such as boron fluoride or aluminum chloride. The resulting polymer is a plastic, elastic solid of very high molecular weight ranging from 1000 to 250,000 or above.

Another type of material which can be used as the second polymer is butyl rubber. As is well known, butyl rubber is a polymer produced by polymerizing a mixture of a conjugated diene, generally isoprene, with a minor amount of a conjugated diene olefin.

Other diene polymers are also suitable. An example of such a diene polymer is cis-polybutadiene.

The polyethylene or similar polymer constitutes, generally, the major amount of the mixture, the range of 50 to 90 parts by weight of the mixture producing films which can be treated according to the process of this invention. Generally, we prefer to use a mixture containing 60 to 80 parts by weight polyethylene per 100 parts of the mixture.

The blends from which the thermoplastic film in accordance with our invention are prepared can be obtained by placing the desired quantities and proportions of the polyethylene and of the polyisobutylene in a Banbury mixer (without prior heating) and mixing the materials in said mixer for a period of 5 to 7 minutes, for example, the temperature of the polymer mixture rising during this time to about 320° F.

An alternative method for preparing the blends consists in milling the polyisbutylene in the Banbury mixer for one minute and then adding the polyethylene and continuing the milling operation for 5 to 7 minutes.

Still another method of preparing the blends according to this invention comprises chopping the polyisobutylene into small particles (e.g. ⅛ to ¼ inch maximum dimension), dry-blending the chopped polyisobutylene with the polyethylene in the form of pellets (e.g. ⅛ x ⅛ inch cylinders) in a kneader or extruder, extruding the blend through dies, and cutting the extrudate into cylindrical pellets.

The thermoplastic blend can be fabricated in the form of film by any method for making thermoplastic film. One method which we have found satisfactory is to extrude the polymer blend, e.g., at 315° to 350° F., in the form of a hollow tube. The end of this tube is then closed, and the tube is inflated to from 1½ to 3 times its extruded diameter. The film is preferably produced in thicknesses of from 4 to 20 mils, preferably 5 to 15 mils.

Stabilizers or other additives can be incorporated into the mixture from which the films are formed in order to stabilize the mixture against deterioration caused by heat, ultraviolet light, etc. Furthermore, pigments or fillers can be added to the blends as desired.

The following example illustrates our invention.

*Example*

Ethylene and butene-1 were copolymerized in a weight ratio of 95/5 in the presence of a catalyst consisting essentially of chromium oxide supported on silica-alumina, the catalyst containing approximately 0.1 weight percent chromium in the hexavalent state. The polymerization was conducted in the presence of cyclohexane at a temperature of 260° F. The resulting polymer had the following properties:

| | |
|---|---|
| Density | 0.950 |
| Melt index | 0.3 |
| Tensile strength, p.s.i. | 3800 |
| Ultimate elongation, percent | 70 |
| Vicat softening temperature, °F. | 255 |

This ethylene-butene-1 copolymer was mixed with polyisobutylene having an average molecular weight of about 120,000 to provide a mixture containing 70 parts by weight of ethylene-butene-1 copolymer to 30 parts by weight of the polyisobutylene. These materials were mixed in a Banbury mixer.

Figure 2:
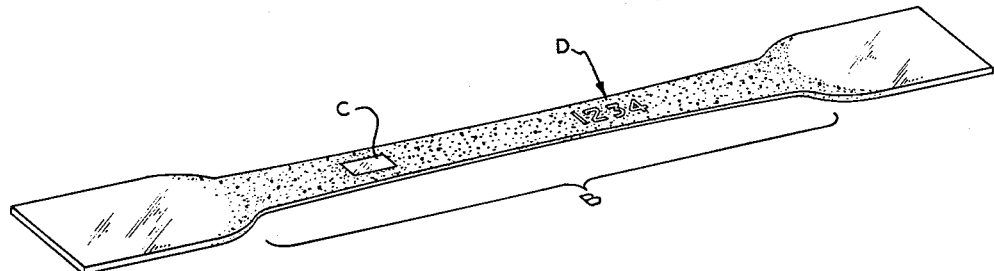

A film of this material, approximately 10 mils thick, was made by the blown film technique and strips were cut therefrom. A strip was pulled until the width was reduced to approximately ½ of the original width and this caused the slightly hazy film to acquire a silvery sheen of high opacity. Thereafter, this film was marked upon by writing thereon by hand with a stylus using approximately 1000 p.s.i. pressure. Where this pressure was applied, the film became transparent and acquired a lower opacity than the original film. This film is illustrated in the drawing accompanying this application, FIGURE 1 showing the film prior to the stretching and pressing operation and FIGURE 2 showing the film after these operations. The portion of the film indicated by the bracket A in FIGURE 1 stretched to the length indicated by the bracket B in FIGURE 2. This portion B was increased in opacity to a degree such that it was difficult to identify objects placed thereunder. Thereafter pressure was applied to an area C and numerals D were placed thereon by marking with a stylus. The area C and the numerals D were transparent. The film does not tend to retract to its original shape after treatment and the areas in which the pressure has been applied remain transparent.

The discovery of the present invention provides, as discussed, a method of printing or writing upon film. Another method of utilizing the present invention is in the production of photographic reproductions. The light transmission of the final product as shown in the drawing is of three different amounts. The unstretched film is slightly hazy, but will transmit most of the light impinging thereon. The stretched but unpressed film passes only a small amount of light while the pressed areas, being transparent, transmit practically all of the light. Thus, by using light sensitive paper beneath the treated film, it is possible to photographically reproduce the indicia pressed in the film.

The density referred to herein is determined by ASTM method D1505-57T. Ethanol and water were used as the suspending liquids. The samples used for density determination are prepared by compression-molding molten pellets of the ethylene polymer to form a slab about 6 inches and ⅓₂ to ½ inch thick. A Pasadena press (model P-325, Pasadena Hydraulics, Inc.), is used. The slabs are molded at 20,000 p.s.i. and 330° F. The heat is then turned off. Tap water is circulated through the mold cooling system. The slab is cooled to 200° F. at the rate of 25° F. per minute, and then to 150° F. as rapidly as possible by increasing the flow rate of the cooling water. The slab is then removed from the mold and allowed to stand for 24 hours at room temperature. Small pieces of the slab, e.g., about ¼ inch squares, are cut off for the density determination. These pieces are examined to be sure that they have no surface pits or other features which might occlude or entrap air when immersed in liquid.

The molecular weight of polyisobutylene, as referred to herein, is based on viscosity determination and is determined in accordance with the method of P. J. Flory, J. Am. Chem. Soc. 65, 372–382 (1943).

The melt index, as referred to herein, is determined in accordance with ASTM method D1238-57T.

Tensile and elongation were determined according to ASTM D412-51T.

As many possible embodiments can be made of this invention without departing from the scope thereof, it is to be understood that all matter herein set forth is to be interpreted as illustrative and not as unduly limiting the invention.

We claim:

1. A method which comprises stretching a film comprising a mixture of an ethylene/butene-1 copolymer and polyisobutylene, the amount of said copolymer being 50 to 90 parts by weight per 100 parts of the mixture, the amount of stretching being sufficient to cause a substantial reduction in the width of the film and to increase the opacity thereof supporting said stretched film upon a substantially non-yielding surface, and producing indicia by marking with a stylus using a pressure of 500 to 20,000 p.s.i., said indicia being transparent.

2. A method which comprises stretching a film comprising a mixture of an ethylene/butene-1 copolymer and polyisobutylene, the amount of said copolymer being 60 to 80 parts by weight per 100 parts of the mixture, the amount of stretching being sufficient to cause a substantial reduction in the width of the film and to increase the opacity thereof supporting said stretched film upon a substantially non-yielding surface, and producing indicia by marking with a stylus using a pressure of 500 to 20,000 p.s.i., said indicia being transparent.

References Cited in the file of this patent

UNITED STATES PATENTS 2,352,725     Markwood _____ July 4, 1944